TELEPHONE PARTY LINE SIGNALING SYSTEM
Filed May 2, 1955
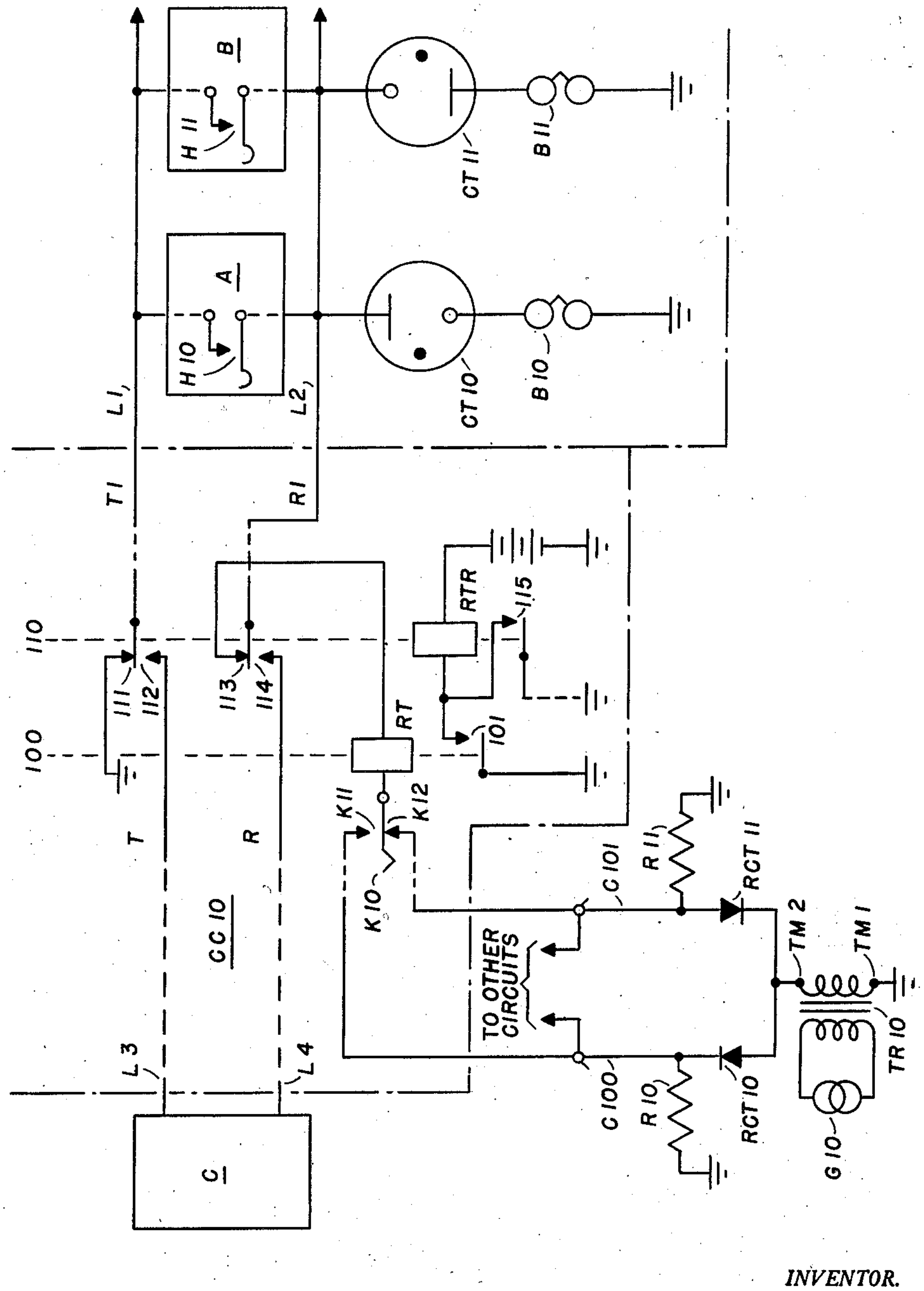
INVENTOR.
WILLIAM H. BERCH
BY [signature]
AGENT 2,790,851

TELEPHONE PARTY LINE SIGNALING SYSTEM

William H. Berch, Penfield, N. Y., assignor, by mesne assignments, to General Dynamics Corporation, a corporation of Delaware Application May 2, 1955, Serial No. 505,366

2 Claims. (Cl. 179—17)

My invention relates to telephone systems in general, and more particularly to a method for signaling on party lines in a telephone system.

At the present time, the so-called superimposed signaling system may be used for selective ringing. In this system a source of ringing current comprising an alternating current generator is placed in series with a biasing battery; the output of the source is connected to a biased telephone ringer comprising a conventional telephone bell in series with a device having high impedance which decreases rapidly upon the application of a minimum firing voltage, such as the well known cold cathode tube. When the tube fires, the ringer impedance drops to the point where it passes enough pulsating current to operate the bell. Thus the bell is energized during that part of the cycle of the alternating generator during which the voltage from the source is greater than the firing voltage and the sustaining voltage of the tube.

In the event that two such ringers are connected in parallel and are to be energized selectively, as in the case of selective ringing party line telephone systems, the biasing tubes in the ringers are poled oppositely to each other and two electrically separate and oppositely biased sources of ringing current are provided. Thus the separate application of ringing voltage from each source is effective to fire the tube and thereby energize only one of the parallel ringers; because the tube in the other ringer does not fire, being poled oppositely to the bias of the ringing source, that other ringer remains inoperative. It is obvious that when a superimposed signaling system is used on selective ringing party lines that the system has the inherent disadvantage of requiring two biasing batteries in order to selectively energize the two parallel ringers.

Accordingly, it is an object of my invention to provide a new and improved system for selectively energizing ringers.

Another object of my invention is to provide a signaling system in which either of two ringers connected in parallel are selectively energized from a single source of energy.

Another object of my invention is to provide a signaling system in which either of two biased ringers connected in parallel are selectively energized from a single source of energy without the use of biasing batteries.

I accomplish these and other objects by providing in the preferred embodiment of my invention a single source of alternating current having first and second terminals for producing an alternating voltage between those terminals. The first of these terminals is connected to ground; the second, ungrounded terminal is connected to unidirectional rectifying means such as dry plate rectifiers which are effective for directing that portion of the output of the alternating current source which is positive with respect to ground into a first path and that portion of the output of the alternating current source which is negative with respect to ground into a second path. A switch or relay is effective for selectively connecting the first and second paths to a conductor of a party line which in turn is connected to one side of each of first and second biased ringers located at first and second stations, respectively, on the line. Each ringer includes a cold cathode tube in series with the winding of a telephone bell of the type well understood by those skilled in the telephone art. The tube in the first ringer is arranged to conduct current in a direction opposite to the direction in which the tube in the second ringer conducts current; the other side of each ringer is connected to ground which constitutes a return path for the ringing current source. Thus, voltage applied to the line conductor from the first path is effective to fire the tube of the first ringer only, while voltage applied to the same line conductor from the second path is effective to fire the tube of the second ringer only; the impedance of either ringer, upon the firing of its tube, drops to a point where sufficient pulsating rectified current from the alternating current source is passed to energize the bell of the ringer.

Further objects and advantages of my invention will become apparent as the following description proceeds, and features of novelty which characterize the invention will be pointed out with particularity in the claims annexed to and forming a part of this specification.

For a better understanding of my invention, reference may be had to the drawing which accompanies this description.

An alternating current generator, G10, capable of producing current of a frequency suitable for use in telephone signaling systems, such as 25 cycles per second, is connected to the lefthand winding of transformer TR10. The righthand winding of transformer TR10 has first and second terminals TM1 and TM2 and serves as a source of alternating current. The first terminal TM1 is connected to ground; the second terminal TM2 is connected to means comprising oppositely poled dry plate rectifiers RCT10 and RCT11 for separating the positive from the negative portions of the voltage at terminal TM2. The turns ratio of the left- and righthand windings of transformer TR10 is such that the voltage produced between terminals TM1 and TM2 exceeds firing and sustaining voltages of the cold cathode tubes incorporated in the ringers of stations on a party line. The relationship of the voltage to the operation of the apparatus is to be more completely described later in this description.

The oppositely poled rectifiers RCT10 and RCT11 are effective for directing the output current from the alternating current source into first and second paths. Rectifier RCT10 is poled so that those portions of the output voltage from the righthand winding of transformer TR10 which are positive with respect to ground are directed into a first path comprising conductor C100; rectifier RCT11 is so poled that those portions of the output voltage of the righthand winding of transformer TR10 that are negative with respect to ground are directed into the second path comprising conductor C101.

The generator, transformer, rectifiers and first and second paths are common equipment for a plurality of switching devices such as the skeletonized representation of cord circuit CC10. Each cord circuit includes a manually operated key such as K10 which has contacts K11 and K12 for selectively connecting conductor C100 or conductor C101, respectively, through the winding of ring trip relay 100 and break contacts 113 on the unoperated ring trip repeater relay to conductor L2 of the line comprising conductors L1 and L2.

Stations A and B are connected to conductors L1 and L2. Associated with station A is a first biased ringer comprising cold cathode tube CT10 and bell B10 which is connected between conductor L2 and ground. Similarly, a second biased ringer comprising cold cathode tube CT11 and bell B11 is associated with station B and connected between conductor L2 and ground in parallel to the station A ringer. Such ringers are well known to those skilled in the telephone art.

The cold cathode tube CT10 in the ringer at station A is connected so that it fires only when a voltage of a certain critical value (characteristic of the tube, and hereafter referred to as the firing voltage) and positive with respect to ground is applied to its terminals at line L2. When the tube fires, its normally high impedance drops, so that current sufficient to operate the bell B10 is passed through ringer A. Tube CT10 continues to fire so long as the voltage applied is higher than its characteristic sustaining voltage. Tube CT11 in the ringer at station B functions in a similar manner except that it is fired in response to a voltage which is negative with respect to ground. Thus it is seen that the positive and negative peak portions of the rectified output of the source comprising transformer TR10 applied to conductor L2 are effective to cause a series of current pulses to flow through the ringers at stations A and B, respectively; furthermore, the current flows only during the time that the voltage output from ransformer TR10 is in excess of the firing and sustaining voltages characteristic of the tubes in the ringers.

The operation of key K10 to close contacts K11 is effective to connect the positive portion of the output of transformer TR10 to conductor L2 to energize the first ringer at station A only; similarly, the closing of contacts K12 on the same key is effective to apply the negative portion of the output of transformer TR10 to conductor L2 to energize the second ringer at station B only. The pulsating current flowing from the alternating current source through either of the ringers at stations A or B over the above traced path including the winding of relay 100 is insufficient to operate relay 100.

In order to respond to an operation of its associated ringer, each of the stations A and B is equipped with means comprising hookswitch contacts, such as H10 and H11 for transmitting an off-hook signal to the cord circuit by completing an obvious low impedance, direct current path between conductors L1 and L2. The completion of such a low impedance path during the time that the alternating current source comprising transformer TR10 is connected to the line completes an operating circuit for ring trip relay 100 as follows: from ground through the righthand winding of transformer TR10, rectifier RCT10 and conductor C100, or rectifier RCT11 and conductor C101, depending upon the position of key K10, the winding of relay 100, break contacts 113 on unoperated relay 110, conductor L2, the hookswitch contacts such as H10 at station A, conductor L1, the break contact 111 of unoperated relay 110 to ground. The pulsating unidirectional current flowing through the winding of relay 100 and the low impedance off-hook signaling circuit is effective for causing relay 100 to operate and close contacts 101. The closing of contacts 101 is effective for operating relay 110 from ground through make contacts 101, the winding of relay 110, through battery BTR to ground. The operation of relay 110 is effective to transfer conductors L1 and L2 from their previously described connection to the alternating current source at now opened break contacts 111 and 113 of relay 110 to conductors T and R at now closed make contacts 112 and 114, respectively, in order to establish a connection between the line comprising conductors L1 and L2 and a line comprising conductors L3 and L4. The operation of relay 110 is also effective for completing a circuit for holding relay 110 in operated condition at make contacts 115. Other means not shown are thereafter effective for opening the holding circuit to release relay 100.

While I have shown and described a specific embodiment of my invention, other modifications will readily occur to those skilled in the art. I do not, therefore, desire my invention to be limited to the specific arrangement shown and described, and I intend in the appended claims to cover all modifications within the scope and spirit of my invention.

What is claimed is:

1. In a signaling system, a line comprising a conductor, first and second means connected in parallel between said conductor and ground for signaling first and second stations, respectively, on said line, each of said first and said second means including means operative in response to the application of pulsating positive and negative voltages, respectively, of certain minimum value for rendering operative said first and said second means, respectively, a source of alternating current having grounded and ungrounded terminals for producing a peak voltage greater than said certain minimum value between said terminals, unidirectionally conductive means connected to said ungrounded terminal for directing that portion of the output of said source that is positive with respect to ground into a first path and that portion of the output of said source that is negative with respect to ground ino a second path, means for selectively connecting said conductor to said first and second paths, another path between said conductor and ground, means at each of said stations for completing said other path, and means operative in response to pulsating current flowing from said source through said other path and unoperative in response to the pulsating current flowing from said source through either of said signaling means for indicating an off-hook signal from either of said stations.

2. In a signaling system, a line comprising a conductor, first and second high impedance ringers connected between said conductor and ground for signaling first and second stations, respectively, on said line, each of said first and said second ringers comprising a cold cathode tube operative in response to the application of minimum positive and negative voltages, respectively, for rendering operative said first and second ringers, respectively, a source of alternating current having a grounded and ungrounded terminal for producing between said terminals a peak voltage greater than the value to which said tubes respond, dry plate rectifiers connected to said ungrounded terminal for directing the positive portion of the output of said source into a first path and the negative portion of the output of said source into a second path, means for selectively connecting said conductor to said first and said second paths, means at each of said stations for completing a low impedance path between said conductors and ground to transmit an off-hook signal over said line, and a relay comprising a winding in series with said source opeartive in response to pulsating current flowing in said low impedance path and unoperative in response to pulsating current flowing through one of said ringers for detecting an off-hook signal from either of said stations.

References Cited in the file of this patent

UNITED STATES PATENTS

| | | |
|---|---|---|
| 1,831,385 | Hague | Nov. 10, 1931 |
| 2,209,883 | Gohorel | July 30, 1940 |
| 2,532,125 | Singer et al. | Nov. 28, 1950 |

OTHER REFERENCES

"Telephony," McMean and Miller, 1922, page 230.